US009355050B2

(12) United States Patent
Zeng et al.

(10) Patent No.: US 9,355,050 B2
(45) Date of Patent: May 31, 2016

(54) SECURE, FAST AND NORMAL VIRTUAL INTERRUPT DIRECT ASSIGNMENT IN A VIRTUALIZED INTERRUPT CONTROLLER IN A MOBILE SYSTEM-ON-CHIP (71) Applicant: QUALCOMM Incorporated, San Diego, CA (US)

(72) Inventors: Thomas Zeng, San Diego, CA (US); Samar Asbe, San Deigo, CA (US); Azzedine Touzni, San Deigo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 14/072,201

(22) Filed: Nov. 5, 2013

(65) Prior Publication Data

US 2015/0127866 A1 May 7, 2015

(51) Int. Cl.
*G06F 13/26* (2006.01)
*G06F 13/24* (2006.01)
(Continued)

(52) U.S. Cl.
CPC ............ *G06F 13/26* (2013.01); *G06F 9/45533* (2013.01); *G06F 9/45558* (2013.01); *G06F 9/4812* (2013.01); *G06F 13/24* (2013.01); *G06F 2009/45579* (2013.01)

(58) Field of Classification Search
USPC .......... 710/260, 261, 262, 264, 266, 268, 269
See application file for complete search history.

(56) References Cited

U.S. PATENT DOCUMENTS

| | | | |
|---|---|---|---|
| 7,613,847 | B2 | 11/2009 | Kjos et al. |
| 8,028,184 | B2 | 9/2011 | Sekiguchi et al. |
| 8,286,162 | B2 | 10/2012 | Neiger et al. |

(Continued)

FOREIGN PATENT DOCUMENTS

| | | |
|---|---|---|
| WO | 2009039162 A1 | 3/2009 |
| WO | 2013147817 A1 | 10/2013 |

OTHER PUBLICATIONS

Arm Limited: "ARM Security Technology—Building a Secure System using TrustZone Technology", Internet Citation, Apr. 30, 2009, pp. 1-XII,1, XP002660015, Retrieved from the Internet: URL:http://infocenter.arm.com/help/topic/com.arm.doc.prd29-genc-009492c/PRD29-GENC-009492C trustzone security whitepaper.pdf [retrieved on Sep. 27, 2011]—pp. 1-108.

(Continued)

*Primary Examiner* — Khanh Dang
(74) *Attorney, Agent, or Firm* — The Marbury Law Group, PLLC (57) ABSTRACT

Aspects include apparatuses and methods for secure, fast and normal virtual interrupt direct assignment managing secure and non-secure, virtual and physical interrupts by processor having a plurality of execution environments, including a trusted (secure) and a non-secure execution environment. An interrupt controller may identify a security group value for an interrupt and direct secure interrupts to the trusted execution environment. The interrupt controller may identify a direct assignment value for the non-secure interrupts indicating whether the non-secure interrupt is owned by a high level operating system (HLOS) Guest or a virtual machine manager (VMM), and whether it is a fast or a normal virtual interrupt. The interrupt controller may direct the HLOS Guest owned interrupt to the HLOS Guest while bypassing the VMM. When the HLOS Guest in unavailable, the interrupt may be directed to the VMM to attempt to pass the interrupt to the HLOS Guest until successful.

21 Claims, 8 Drawing Sheets

(51) Int. Cl.
*G06F 9/455* (2006.01)
*G06F 9/48* (2006.01)

(56) References Cited

U.S. PATENT DOCUMENTS

| | | | |
|---|---|---|---|
| 8,489,789 B2 | 7/2013 | Serebrin et al. | |
| 2004/0117532 A1 | 6/2004 | Bennett et al. | |
| 2004/0187117 A1* | 9/2004 | Orion et al. | 718/100 |
| 2005/0160210 A1* | 7/2005 | Watt et al. | 710/269 |
| 2005/0228921 A1* | 10/2005 | Sethi et al. | 710/268 |
| 2007/0143515 A1* | 6/2007 | Kershaw et al. | 710/264 |
| 2009/0157936 A1* | 6/2009 | Goss et al. | 710/264 |
| 2013/0174148 A1 | 7/2013 | Amit et al. | |
| 2014/0351472 A1* | 11/2014 | Jebson et al. | 710/269 |

OTHER PUBLICATIONS

International Search Report and Written Opinion—PCT/US2014/063746—ISA/EPO—Jan. 21, 2015.
Winter J., "Trusted computing building blocks for embedded linux-based ARM trustzone platforms", Proceedings of the 3rd ACM Workshop on Scalable Trusted Computing, STC '98, Oct. 31, 2008, pp. 21-39, XP055117999, New York, New York, USA DOI: 10.1145/1456455.1456460 ISBN: 978-1-60-558295-5 p. 25-p. 28.

* cited by examiner

SECURE, FAST AND NORMAL VIRTUAL INTERRUPT DIRECT ASSIGNMENT IN A VIRTUALIZED INTERRUPT CONTROLLER IN A MOBILE SYSTEM-ON-CHIP

BACKGROUND

Modern interrupt controllers typically are designed to support device virtualization with the assumption that there is a scheduler or scheduler architecture whereby the Virtual Machine Monitor (VMM) software traps every interrupt in order to make a scheduler decision regarding the high level operating system (HLOS) Guest to which the incoming interrupt should be routed. The VMM software routes the physical interrupt to the selected HLOS Guest as a virtual interrupt signal. The overhead associated with this VMM software routing step has been known to slowdown interrupt response time.

The mobile phone market sometimes deploys device virtualization as an access control infrastructure for a single guest HLOS, or as a virtualization solution with small number of guest HLOS instances (typically two). It is common in the mobile device virtualization environment that the interrupts, if not owned by the VMM, are owned by the current HLOS Guest. It is also common that the access control requirements allow the virtual processor identifier and virtual interrupt identifier to stay the same as the physical processor identifier and the physical interrupt identifier, respectively.

SUMMARY

The methods and apparatuses of various aspects provide circuits and methods for assigning one or more interrupts in a computing device including routing the interrupt to a trusted execution environment when a configuration of an interrupt identifier indicates an associated security level, correlating an interrupt direct assignment value with the interrupt, in which the interrupt direct assignment value indicates an owner of the interrupt, routing the interrupt to a high level operating system guest virtual machine as a fast virtual interrupt or a normal virtual interrupt when the interrupt direct assignment value indicates the high level operating system guest is the owner of the interrupt, and routing the interrupt to a virtual machine monitor when the assignment value indicates the virtual machine monitor is the owner of the interrupt.

An aspect method may further include checking for an available spot in an interrupt list when the interrupt direct assignment value indicates the high level operating system guest is the owner of the interrupt, in which routing the interrupt to the high level operating system guest virtual machine includes routing the interrupt to the high level operating system guest virtual machine when there is the available spot in the interrupt list bypassing the virtual machine monitor, and routing the interrupt to the virtual machine monitor when the interrupt list is occupied. An aspect method may further include disabling correlating the interrupt direct assignment value to the interrupt when the interrupt list is occupied.

An aspect method in which the interrupt direct assignment value further indicates a priority of the interrupt, in which routing the interrupt to the high level operating system guest virtual machine includes routing the interrupt as a virtual interrupt corresponding to a physical interrupt, the virtual interrupt having a virtual interrupt identification being the same as a physical interrupt identification of the corresponding physical interrupt, and in which routing the interrupt to the virtual machine monitor includes routing the interrupt as the physical interrupt. An aspect method in which the priority of the interrupt comprises a fast interrupt and a normal interrupt, and in which routing the interrupt to the high level operating system guest virtual machine further includes routing the interrupt to a first interrupt interface dedicated for fast virtual interrupts when the interrupt is the fast interrupt, and routing the interrupt to a second interrupt interface dedicated for normal virtual interrupts when the interrupt is the normal interrupt.

An aspect in which the configuration of the interrupt identifier comprises an interrupt security group value, the method may further include correlating the interrupt security group value with the interrupt, in which the interrupt security group value indicates an interrupt type, determining whether the interrupt is a secure interrupt type or a non-secure interrupt type, and in which routing the interrupt to the trusted execution environment when the configuration of the interrupt identifier indicates the associated security level comprises includes routing the interrupt to the trusted execution environment on a processor when the interrupt security group value indicates the interrupt is of the secure interrupt type, in which correlating the interrupt direct assignment value with the interrupt includes correlating the interrupt direct assignment value with the interrupt when the interrupt security group value indicates the interrupt is of the non-secure interrupt type. An aspect method in which routing the interrupt to the high level operating system guest virtual machine as the fast virtual interrupt or the normal virtual interrupt when the interrupt direct assignment value indicates the high level operating system guest is the owner of the interrupt includes routing the interrupt to a normal execution environment on the processor, and in which routing the interrupt to the virtual machine monitor when the assignment value indicates the virtual machine monitor is the owner of the interrupt includes routing the interrupt to the normal execution environment on the processor.

An aspect includes a computing device, including a first processor configured to run a high level operating system guest virtual machine, a second processor configured to run a virtual machine monitor, an interrupt direct assignment control register configured to store an direct assignment control value, an interrupt direct assignment register configured to store interrupt direct assignment values of interrupts, and an interrupt distributor coupled to the interrupt direct assignment control register, the interrupt direct assignment register, the first processor, and the second processor, in which the interrupt distributor is configured to perform operations including routing the interrupt to a trusted execution environment when a configuration of an interrupt identifier indicates an associated security level, correlating an interrupt direct assignment value with the interrupt, in which the interrupt direct assignment value indicates an owner of the interrupt, routing the interrupt to the high level operating system guest virtual machine as a fast virtual interrupt or a normal virtual interrupt when the interrupt direct assignment value indicates the high level operating system guest is the owner of the interrupt, and routing the interrupt to the virtual machine monitor when the assignment value indicates the virtual machine monitor is the owner of the interrupt.

An aspect includes a computing device, including means for routing an interrupt to a trusted execution environment when a configuration of an interrupt identifier indicates an associated security level, means for correlating the interrupt direct assignment value with the interrupt, in which the interrupt direct assignment value indicates an owner of the interrupt, means for routing the interrupt to a high level operating system guest virtual machine as a fast virtual interrupt or a normal virtual interrupt when the interrupt direct assignment value indicates the high level operating system guest is the owner of the interrupt, and means for routing the interrupt to a virtual machine monitor when the assignment value indicates the virtual machine monitor is the owner of the interrupt.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "computing device" and "mobile device" are used interchangeably herein to refer to any one or all of cellular telephones, smartphones, personal or mobile multimedia players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, and a programmable processor. While the various aspects are particularly useful for mobile computing devices, such as smartphones, which have limited resources, the aspects are generally useful in any electronic device that implements a virtual machine or high level operating system Guest, and routes and process interrupt requests for the mobile device hardware and the high level operating system Guest.

The terms "system-on-chip" (SoC) and "integrated circuit" are used interchangeably herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon. Such a configuration may also be referred to as the IC components being on a single chip.

For ease of reference, the appropriate machine/process is referred to as the "owner" of the interrupt and interrupts are referred to as "owned by" the appropriate machine/process.

Mobile computing systems may be configured to execute operations in a standard execution environment and in a trusted execution environment. In a mobile device the trusted execution environment may be implemented to provide processing for applications including, for example, secured PIN entry for enhanced user authentication in mobile payments and banking, digital rights management (DRM), enterprise and web-based services, anti-malware applications that are protected from software attack, software license management, loyalty-based applications, access control of cloud-based documents, and e-Ticketing Mobile TV. A trusted execution environment enabled system may be achieved by partitioning SoC hardware and software resources so that they exist in one of two worlds; the secure world for the security subsystem, and the normal world for everything else.

Interrupts on a mobile device implementing a trusted execution environment may be divided into secure and non-secure categories. To manage interrupts in such implementations, conventional systems may use a virtual machine monitor or hypervisor software to route secure interrupts to the appropriate virtual machine or processor. However, the overhead involved in such conventional routing of interrupts can delay responses to interrupts, reduce system responsiveness, and consume system resources in a manner that can impact the user experience.

In an aspect a virtual interrupt direct assignment method and apparatus can alleviate slowdowns in secure interrupt response time caused by an overhead associated with virtual machine monitor (VMM) or hypervisor software routing of secure interrupts to an appropriate virtual machine/processor. The method and apparatus can remove the VMM software overhead for secure interrupts owned by the trusted execution environment of the SoC by designating assignment values to interrupts, and based on the assignment values, routing the secure interrupts to the trusted execution environment of the SoC, thereby bypassing the VMM software in the normal environment.

In an aspect a virtual interrupt direct assignment method and apparatus can alleviate slowdowns in interrupt response time caused by the overhead associated with VMM or hypervisor software routing of interrupts to an appropriate virtual machine/processor. The method and apparatus can remove the VMM software overhead for interrupts owned by a high level operating system (HLOS) Guest by designating assignment values to interrupts, and based on the assignment values, routing the interrupts to the HLOS Guest, thereby bypassing the VMM software. In some aspects the HLOS Guest may own the majority of the interrupts and in some instances a high majority, for example approximately 90% of the interrupts.

In an aspect, the apparatus and method implement virtual interrupt direct assignment, designating interrupts assignment values to identify the owners/intended processes (i.e., the process that should respond to the interrupt) and types of interrupts, and routing the interrupts to the owners according to the assignment values. A virtual interrupt direct assignment method may be implemented in hardware that is discussed in greater detail below.

In an aspect the apparatus and method implement virtual interrupt direct assignment, checking whether the processor running the HLOS Guest is available to accept the interrupt, and assigning the interrupt to the VMM when the processor is unavailable. The VMM may continue to try to provide the interrupt to the processor until the processor accepts the interrupt.

Figure 1:
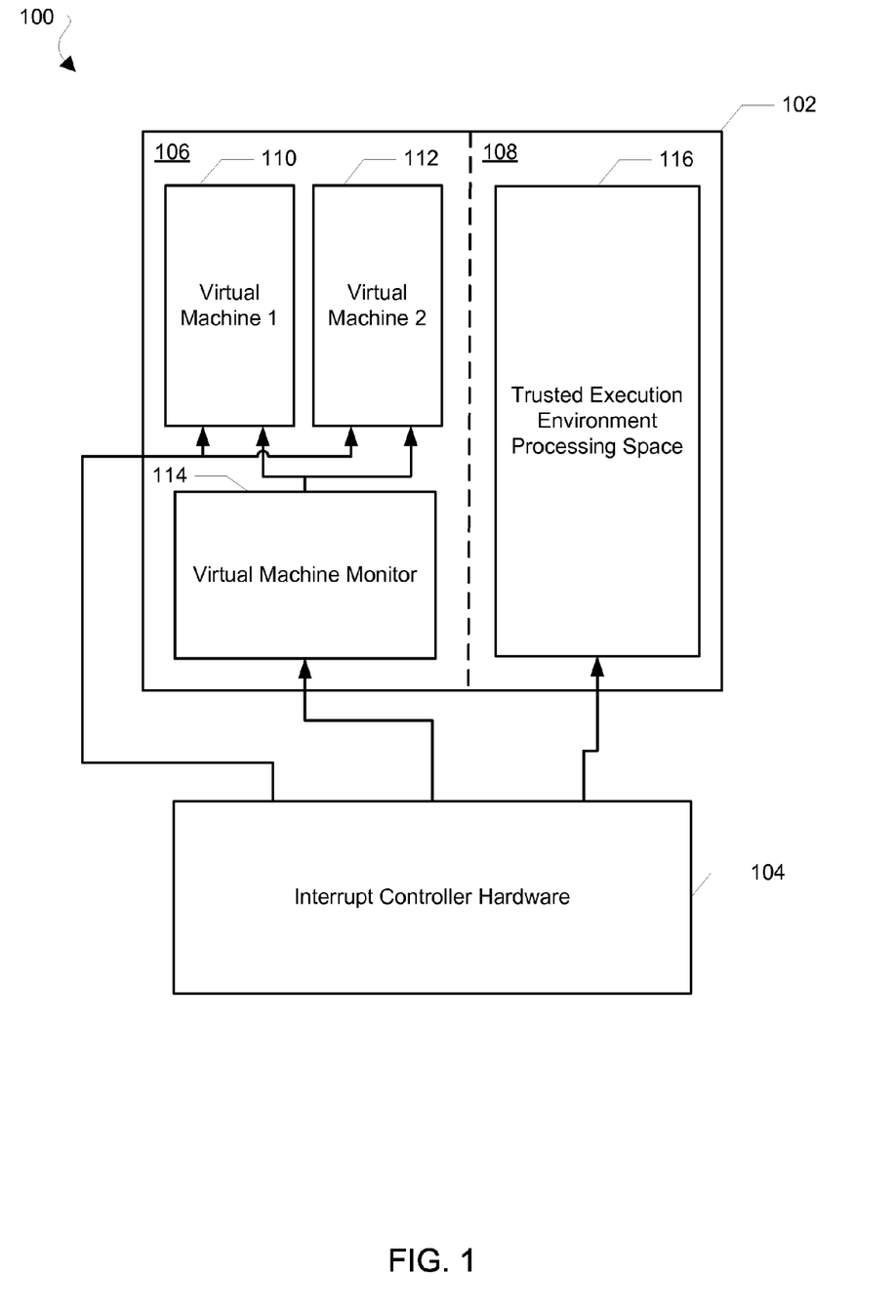
FIG. 1 is a component block diagram illustrating an apparatus having a plurality of execution environments configured to process secure and non-secure, physical and virtual interrupts, respectively, in accordance with an aspect.

FIG. 1 illustrates an apparatus having a plurality of execution environments configured to process secure and non-secure, physical and virtual interrupts, respectively, in accordance with an aspect. An SoC 100 of a mobile device may include a processor 102 and an interrupt controller hardware 104. The processor 102 may include a number of execution environments, which may result, in part, from portioning the processor components, resources, and hardware to create separate processing spaces one the SoC 100. In an aspect the execution environments may be implemented on the same or separate cores of a processor 102, or on the same or separate processors 102 of the SoC 100.

The execution environments may have different characteristics and purposes. In an aspect, an execution environment may be a normal (or non-secure) execution environment 106, intended for execution of normal (or non-secure) processing tasks. Another execution environment may be a trusted (or secure) execution environment 108, intend for execution of processes dealing with sensitive processes and/or information, such as personal or sensitive information, exposing system vulnerabilities, and/or legally restricted information and processes.

The normal execution environment 106 may include one or more virtual machines 110, 112, such as an HLOS Guest virtual machine, for managing the processing tasks in the normal execution environment 106. A VMM 114 may also be included for directing processes to the virtual machine 110, 112 that owns the process. The VMM 114 may also direct processes to the processor 102 itself when the processes are not owned by one of the virtual machines 110, 112. The trusted execution environment may include a trusted execution environment processing space 116, which may be configured to process secure processes. These execution environments 106, 108 and their components may also be configured to manage non-secure and secure interrupts, respectively.

The interrupt controller hardware 104 may be configured to receive interrupts from various sources. The interrupt controller hardware 104 may identify the type of interrupt for a received interrupt and route the interrupt to the interrupt owner. The interrupt types may include non-secure/secure and physical/virtual interrupts. In an aspect, any secure interrupt may be routed directly to the trusted execution environment processing space 116. Similarly, a non-secure physical interrupt may be routed directly to the VMM 114, and a non-secure virtual interrupt may be routed directly to the appropriate virtual machine 110, 112 which owns the non-secure virtual interrupt. Aspects of identifying the type of interrupt and routing the interrupts by the interrupt controller hardware are further described below.

Figure 2:
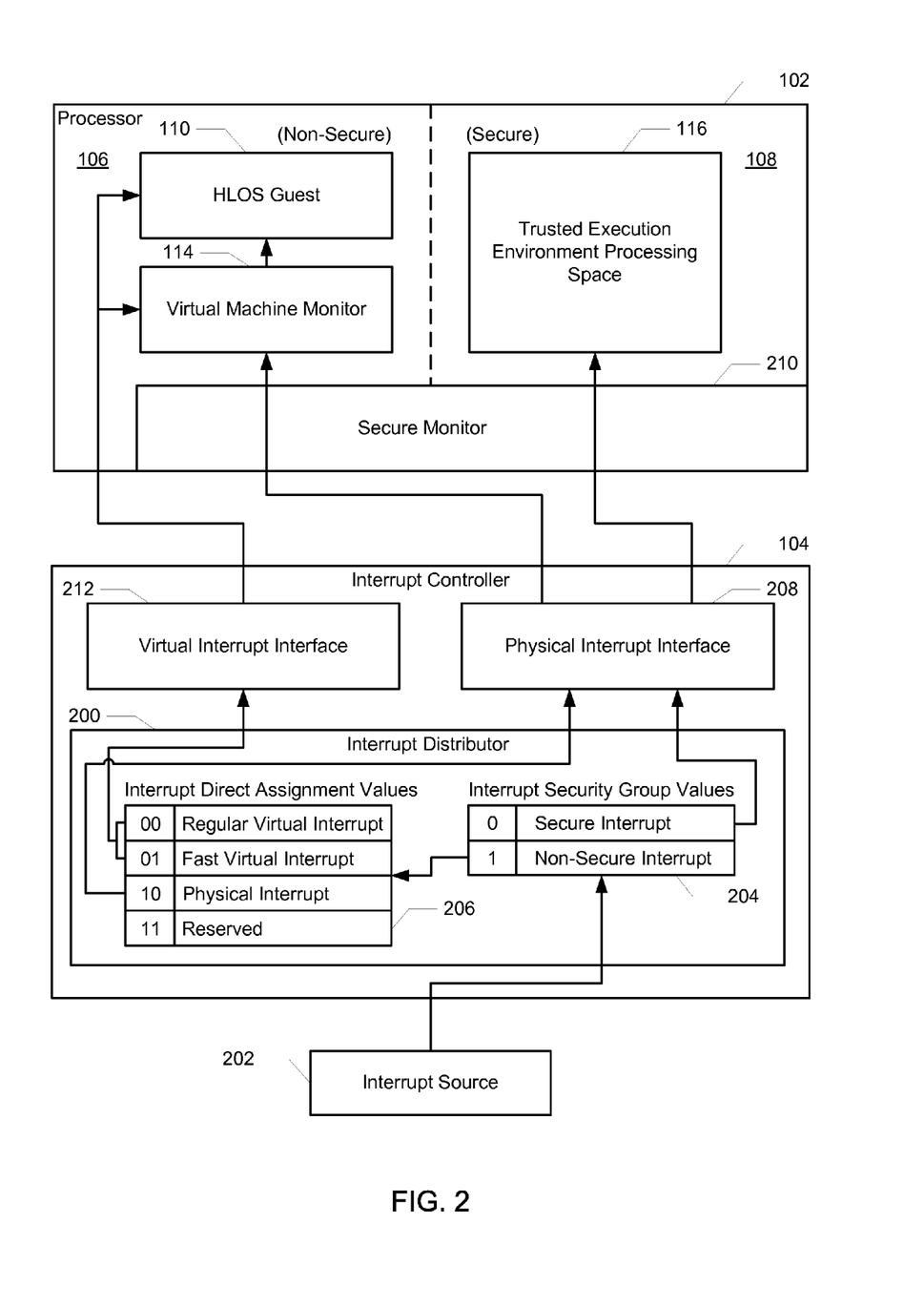
FIG. 2 is a component block diagram illustrating an apparatus having a plurality of execution environments configured to process secure and non-secure, physical and virtual interrupt, respectively, in accordance with an aspect.

FIG. 2 illustrates an apparatus having a plurality of execution environments configured to process secure and non-secure, physical and virtual interrupt, respectively, in accordance with an aspect. The interrupt controller 104 may include an interrupt distributor 200, which may be configured to determine the type of interrupt received from an interrupt source 202, such as hardware or software of the mobile device, hardware of a device connected to the mobile device, like a peripheral device, or software running on the connected device. The interrupt distributor 200 may retrieve one or more interrupt identifiers associated with a received interrupt, for example, by looking up the interrupt number and finding the identifiers associated with the specific interrupt. The interrupt distributor 200 may interpret the identifiers to route the received interrupt to the appropriate owner for processing.

In an aspect, a configuration of the interrupt identifier of the received interrupt may indicate to the interrupt distributor 200 a security level associating the received interrupt with one of the execution environments. In an aspect, an interrupt security group identifier may be a value 204 that identifies the received interrupt as either a non-secure interrupt or a secure interrupt. The interrupt security group value 204 may include any of a variety or known data types or a variety of known codes that can represent a finite number of characteristics. For example, the interrupt security group value may be represented by a one bit binary code representing the two options of secure and non-secure interrupts. In other aspects there may be more than two security characteristics for the received interrupt, and more robust representations of the characteristics may be used. Continuing with the example illustrated in FIG. 2, the interrupt distributor 200 may retrieve the interrupt security group identifier having a value of "0" and interpret the value 204 to indicate that the received interrupt is a secure interrupt. Alternatively, the interrupt distributor 200 may retrieve the interrupt security group identifier having a value of "1" and interpret the value 204 to indicate that the received interrupt is a non-secure interrupt.

When the interrupt security group identifier has the value of "0" in the example illustrated in FIG. 2, the interrupt distributor 200 may route the interrupt to a physical interrupt interface 208, which may route the interrupt to the processor 102, and specifically to the trusted execution environment processing space 116. Because, the interrupt security group identifier has the value of "0" the interrupt controller 104 knows that the interrupt is to be processed in the trusted execution environment 108, and therefore may bypass sending the interrupt to the VMM 114 to determine the owner of and route the interrupt. The hardware implementation or the interrupt controller 104 and the avoidance of the VMM 114 software reduces the time need to route the interrupt to the known owner, in this case the trusted execution environment processing space 116.

In an aspect, the secure interrupt may be received by the processor 102 and checked by a secure monitor 210 for the interrupt security group identifier. The secure monitor 210 may manage when the processor is in a secure state or a non-secure state, so the secure monitor 210 may check the interrupt security group identifier to determine whether the processor needs to switch states to handle the interrupt. When not already in a secure state, the secure monitor 210 may change the state of the processor 102 and allow the interrupt to pass to the trusted execution environment processing space 116. When already in a secure state, the secure monitor 210 may make no changes to the state of the processor and allow the interrupt to pass to the trusted execution environment processing space 116.

When the interrupt security group identifier has the value of "1" in the example illustrated in FIG. 2, the interrupt distributor 200 may retrieve an interrupt direct assignment identifier. The interrupt distributor 200 may retrieve an interrupt direct assignment value 206 of the identifier that identifies the received interrupt as either a regular virtual interrupt, a fast virtual interrupt, a physical interrupt, or an unrecognized signal. The interrupt direct assignment value 206 may include any of a variety of known data types or a variety of known codes that can represent a finite number of characteristics. For example, the interrupt security group value may be represented by a two bit binary code representing four options, like the options noted above. In other aspects, there may be more or less than four direct assignment characteristics for the received interrupt, including a variety or speeds or priorities of interrupts, and more or less robust representations of the characteristics may be used.

Continuing with the example illustrated in FIG. 2, the interrupt distributor 200 may retrieve the interrupt direct assignment identifier 206 and use the value to determine the type of interrupt. For example, an interrupt direct assignment identifier value of "00" may indicate that the received interrupt is a regular virtual interrupt. As another example, an interrupt direct assignment identifier value of "01" may indicate that the received interrupt is a fast virtual interrupt. As another example, an interrupt direct assignment identifier value of "10" may indicate that the received interrupt is a physical interrupt. As another example, an interrupt direct assignment identifier value of "11" may indicate that the received interrupt is an unrecognized signal.

Continuing with the example illustrated in FIG. 2, when an interrupt has an interrupt direct assignment identifier value of "00" or "01," the interrupt distributor 200 may route the interrupt to a virtual interrupt interface 212, which may route the interrupt to the processor 102, and specifically to the HLOS Guest 110. Because the interrupt security group identifier has the value of "1" the interrupt controller 104 knows that the interrupt does not need to be processed in the trusted execution environment 108. And, because the interrupt direct assignment identifier has the value of "00" or "01" the interrupt controller 104 knows that the interrupt is owned by the HLOS Guest 110 by virtue of being a virtual interrupt. Therefore, the interrupt controller 104 may bypass sending the interrupt to the VMM 114 to determine the owner of and route the interrupt. The hardware implementation or the interrupt controller 104 and the avoidance of the VMM 114 software reduces the time need to route the interrupt to the known owner, in this case HLOS Guest 110.

In an aspect, the processor 102 may be busy and the HLOS Guest 110 may not be able to immediately accept the interrupt. In such circumstances, the interrupt controller 104 may route the interrupt to the VMM 114, which may operate normally to determine the owner of the interrupt and route the interrupt, in this case to the HLOS Guest 110. If the processor 102 continues to be busy, and the HLOS Guest 110 continues to be unable to accept the interrupt, the VMM 114 may continue to try to route the interrupt until it is successful.

When the interrupt direct assignment identifier has the value of "10," the interrupt distributor 200 may route the interrupt to the physical interrupt interface 208, which may route the interrupt to the processor 102, and specifically to the VMM 114. Because the interrupt security group identifier has the value of "1" the interrupt controller 104 knows that the interrupt does not need to be processed in the trusted execution environment 108. And, because the interrupt assignment identifier has the value of "10" the interrupt controller 104 knows that the interrupt may pass to the VMM 114 to determine the owner of and route the interrupt by virtue of being a physical interrupt.

In an aspect, when the interrupt is a physical interrupt, the interrupt may pass through the secure monitor 210 while routing the interrupt from the to the interrupt controller 104 to the VMM 114. As previously discussed, the secure monitor 210 may check the interrupt security group identifier to determine whether to switch the processor state between secure and non-secure processing. In this example, the interrupt security group identifier has the value of "1" indicating a non-secure interrupt, so the secure monitor 210 may maintain a non-secure state or switch from a secure state to a non-secure state to process the interrupt.

When the interrupt direct assignment identifier has the value of "11," the interrupt distributor 200 may ignore the interrupt or discard it. The interrupt direct assignment identifier has the value of "11" may indicate an unexpected or unrecognized signal. Depending on a state or condition of the mobile device, a known interrupt number may be correlated with different interrupt direct assignment values 206 at different times. When the interrupt direct assignment identifier has the value of "11" for a know interrupt number, i.e. the interrupt number and the interrupt direct assignment value 206 are correlated, this may indicate that the known interrupt number is unexpected for the current state or condition of the mobile device. The interrupt distributor 200 may also retrieve interrupt direct assignment identifier has the value of "11" for all unknown interrupt numbers, i.e. interrupt numbers that do not have a correlated interrupt direct assignment value 206.

Figure 3:
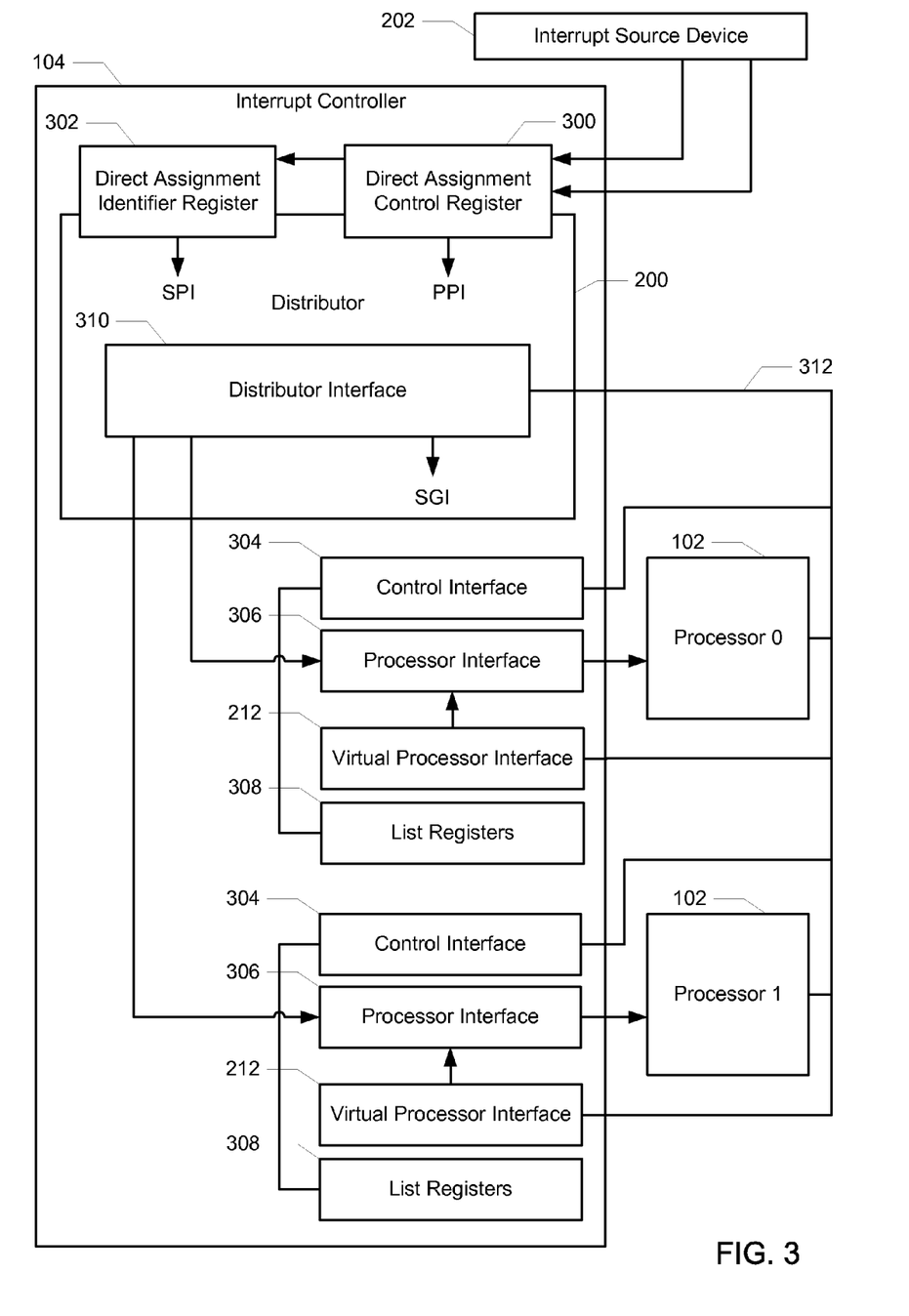
FIG. 3 is a component block diagram illustrating an apparatus configured to directly assign virtual interrupts to a processor running the HLOS Guest owner of the interrupt, in accordance with an aspect.

FIG. 3 illustrates an apparatus configured to directly assign virtual interrupts to a processor running the HLOS Guest owner of the interrupt in accordance with an aspect. The interrupt controller (IC) 104 may be communicatively connected to the processors 102 and the interrupt source device 202. The interrupt controller 104 may also include the interrupt distributor 200 and the virtual interrupt interface 212 (or virtual processor interface) as described herein. Further, the interrupt controller 104 may include one or more direct assignment control registers 300, direct assignment identifier registers 302, control interfaces 304, processor interfaces 306, and list registers 308. The interrupt distributor 200 may include an interrupt distributor interface 310. A number of these components may be connected by a memory mapped input/output (MMIO) interface 312, including, for example, the processors 102, the interrupt controller 104, the interrupt distributor 200, the interrupt distributor interface 310, the control interfaces 304, and the virtual interrupt interfaces 212.

In an aspect, an interrupt may arise from an interrupt source device 202 connected to the apparatus, as a peripheral interrupt of various types, such as a private peripheral interrupt (PPI) or a shared peripheral interrupt (SPI). The private peripheral interrupt may be routed to a particular processor interface 306. The shared peripheral interrupt may be assigned to any processor interface 306. The interrupt signals may be directed to and received by the interrupt controller 104. The direct assignment control register 300 may store an interrupt controller hypervisor direct assignment control value (ICH_AssignControl), which may determine whether to allow the apparatus to retrieve an interrupt direct assignment identifier for an interrupt to implement the virtual interrupt direct assignment, or to disable the interrupt direct assignment identifier retrieval. The latter effectively disables the virtual interrupt direct assignment. The direct assignment control register 300 may also store an interrupt controller hypervisor direct assignment disable status value (ICH_AssignDisableSatuts), which may indicate whether there is an available hardware register to accept an interrupt via the virtual interrupt direct assignment. The direct assignment control register 300 may be part of the interrupt controller 104, part of the interrupt distributor 200, or a separate component from the interrupt controller 104. There may be an ICH_AssignControl and an ICH_AssignDisableSatuts for each processor 102 of the apparatus identified by each processor's P_INDEX value.

The direct assignment identifier register 302 may store a plurality of interrupt controller distributor direct assignment values (ICD_ASSIGNn), which are analogous to the interrupt direct assignment values described herein. These ICD_ASSIGNn values are the interrupt assignment values that identify whether the HLOS Guest or the VMM software owns the interrupts and the types of interrupts. The direct assignment identifier register 302 may store a relation of each interrupt number with its ICD_ASSIGNn value. The direct assignment identifier register 302 may be part of the interrupt controller 104, part of the interrupt distributor 200, or a separate component from the interrupt controller 104.

The interrupt distributor 200 may be located on the interrupt controller 104 and be capable of receiving the peripheral interrupts (e.g., PPI and SPI). The interrupt distributor 200 may also include the interrupt distributor interface 310 that may receive software generated interrupts (SGI) from the VMM, HLOS Guest, or other software. The interrupt distributor interface 310 may also route the interrupts to the appropriate processor 102. The interrupt distributor 200 may accesses the direct assignment identifier register 302 to correlate the interrupts on the interrupt distributor 200 with their related ICD_ASSIGNn values. In an aspect, SPIs may be correlated with their related ICD_ASSIGNn values while PPIs do not need to be correlated with their related ICD_ASSIGNn value because they are correlated with a specific processor interface 306.

The interrupt controller 104 may also include interrupt lists in the form of the list registers 308 which, when they have an open spot, accept the virtual normal and fast interrupts assigned to the HLOS Guest by the interrupt distributor 200 and routed by the from the interrupt distributor interface 310. The list registers 308 may store the interrupt numbers in interrupt controller hypervisor list register structures (ICH_LRn). The ICH_LRn may store values for identifying the virtual interrupts (VirtualID), which are the same as the values identifying the corresponding physical interrupts, and values for identifying the type of interrupt (Grp). The virtual processor interfaces 212 may also be a part of the interrupt controller 104, and control passing of the virtual interrupts to the processor interfaces 306, which pass the interrupts (physical and virtual) to the a processors 102 running the VMM or HLOS Guest depending on the ownership of the interrupts. Virtual processor interfaces 212 may be dedicated to handling a particular type of interrupt, such as being dedicated to handling fast virtual interrupts or normal virtual interrupts.

The control interfaces 304 interface with the VMM software when there are no spots available in the list registers 304 for an interrupt. The control interfaces 304 may allow the VMM software to interface with the direct assignment control register 300 and to set the values for the ICH_AssignControl and the ICH_AssignDisableSatuts. Thus, the control interfaces 304 may allow switching back and forth between a virtual interrupt direct assignment mode, potentially bypassing the VMM software, and a VMM mode, including the VMM software in the interrupt assignment process.

In an aspect the apparatus may implement a virtual interrupt direct assignment upon receiving an interrupt by the interrupt distributor 200. The interrupt distributor 220 may check whether the HLOS Guest's interrupt controller hypervisor hardware running on a processor 102 (having a P_INDEX value) has any available associated list registers 308. When there is availability in the list register 308 associated with the processor 102 and the HLOS Guest, the interrupt distributor 200 may check the direct assignment identifier register 302 for the ICD_ASSIGNn value associated with the received interrupt. When the ICD_ASSIGNn value indicates that the interrupt is owned by the HLOS Guest, the interrupt distributor 200 may set the VirtualID value identifying the virtual interrupt to the ICH_LRn at the available spot in the list register 308. When the ICD_ASSIGNn value signifies a normal virtual interrupt, the Grp value "1" may be set to the ICH_LRn to signify the normal virtual interrupt. Similarly, when the ICD_ASSIGNn value signifies a fast virtual interrupt, the Grp value "0" may be set to the ICH_LRn to signify the fast virtual interrupt.

In an aspect, a fast virtual interrupt may have priority over a normal virtual interrupt. When a fast virtual interrupt is identified, it may be assigned to a list register 308 designated for fast virtual interrupts. Alternatively, interrupts already listed in the list register 308 may be shifted to allow for the fast virtual interrupt to be within the structure of the list register 308, for example a linked list, such that the fast virtual interrupt may be processed sooner than the normal virtual interrupts in the list register 308.

When there is no availability in the list register 308 associated with the processor 102 for receiving the interrupt, the control interface 304 may connect the VMM software and the direct assignment control register 300. Through the control interface 304, the VMM software may disable the ability to bypass the VMM by writing a value, such as "0," to the ICH_AssignControl of the direct assignment control register 300 for the processor 102. The VMM software may repeatedly poll the ICH_AssignDisableSatuts of the direct assignment control register 300 for the processor 102 until its value changes to signify availability in the list register 308, such as by having a value of "1." While the direct assignment control register 300 remains disabled, the VMM software may process the interrupts and assign them by common convention. In an aspect, once the VMM software assigns an interrupt, it may enable the direct assignment function by changing the direct assignment control register's values. When still no availability is found in the list register 308, the VMM software may again disable the direct assignment function. This process may be performed repeatedly.

By disabling the direct assignment function, the VMM software avoids a race condition between the VMM software and the interrupt controller 104 to update the list registers 308 with interrupt information. Similarly, if the VMM software has any other reason to update the list registers 308, it will disable the direct assignment control register 300 to avoid the list registers 308 being updated by different sources.

Figure 4:
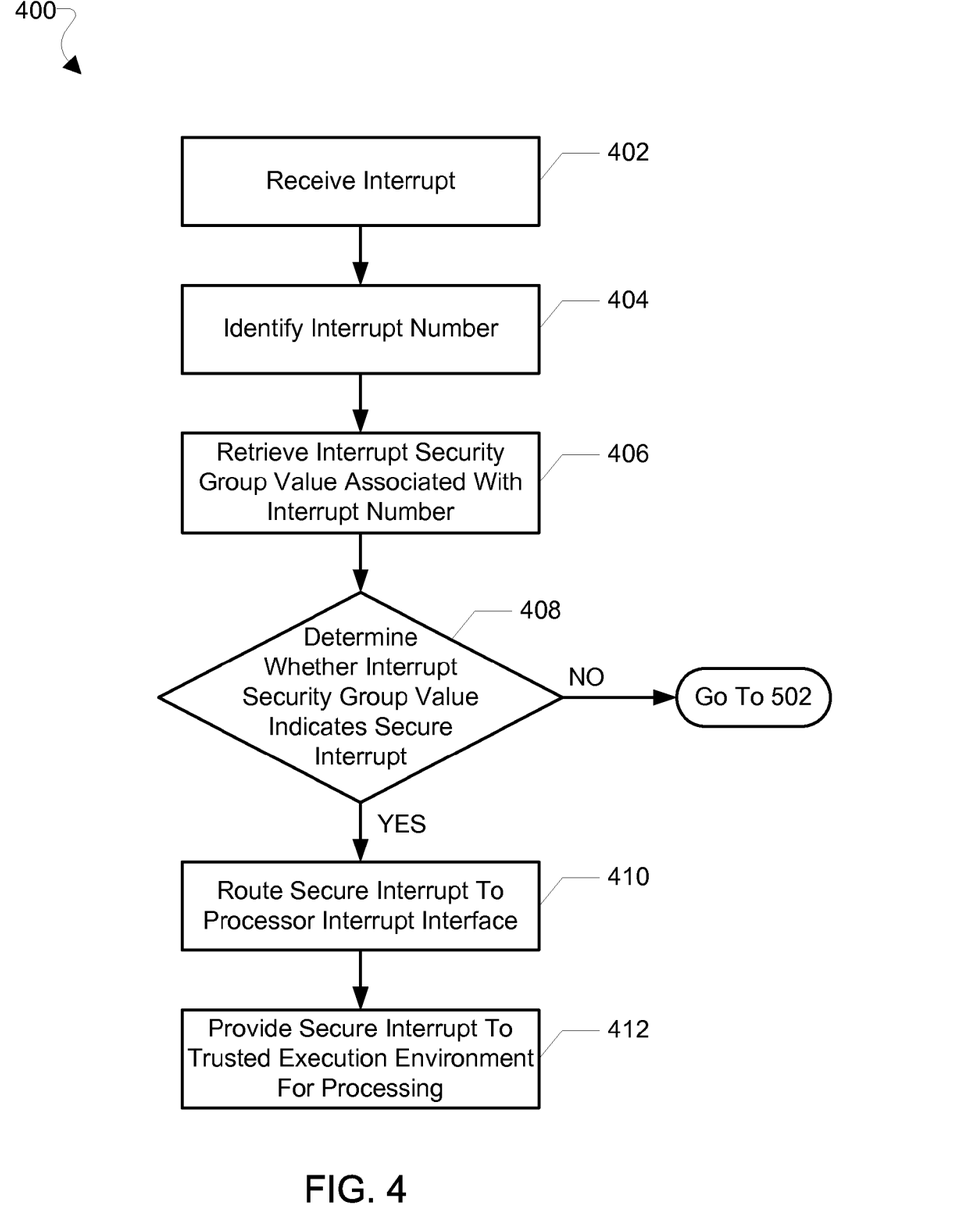
FIG. 4 is a schematic process flow diagram illustrating an aspect method for virtual interrupt direct assignment managing non-secure and secure interrupts.

FIG. 4 illustrates an aspect method 400 for virtual interrupt direct assignment managing of non-secure and secure interrupts. The SoC, including the processors having the secure and non-secure executing environments and the interrupt controller including its components as described herein, may implement this method 400. In block 402 the SoC may receive an interrupt. The interrupt may originate from hardware or software, and be categorized as a secure, non-secure, virtual, and/or physical interrupt. Each interrupt may also have an interrupt number or identification (such as a virtual interrupt identifier/Virtual ID or physical interrupt identifier/Physical ID) to help the processor and/or the HLOS Guest identify the interrupt and the task to which it relates. In block 404 the SoC may identify the interrupt number of the interrupt, which the SoC may use to route the interrupt and the processor may use to execute the interrupt.

In block 406 the SoC may retrieve the interrupt security group value associated with the interrupt number. As described above, the interrupt security group value is the value for the interrupt security group identifier of the interrupt. The SoC may use the interrupt security group value to determine whether the interrupt is classified as a secure or non-secure interrupt indicating what type of processing environment the interrupt requires. This information may aid the SoC to determine the processor to which the interrupt should be routed and SoC components through which to route the interrupt. In determination block 408 the SoC may determine whether the interrupt security group value indicates that the interrupt is a secure interrupt or a non-secure interrupt. When the interrupt security group value indicates that the interrupt is a secure interrupt (i.e., determination block 408="Yes"), the SoC may route the secure interrupt to the appropriate interrupt interface in block 410. When the processor is available to receive an interrupt, the SoC may provide the secure interrupt to the trusted execution environment of the processor for processing in block 412. As previously described, the processor may implement a secure monitor to check the interrupt to determine whether the processor needs to change states between secure processing and non-secure processing in order to handle the received interrupt. When the interrupt security group value indicates that the interrupt is a non-secure interrupt (i.e., determination block 408="No"), the SoC may determine that the interrupt is a non-secure interrupt and may perform the operations in block 502 of method 500 described below with reference to FIG. 5.

Figure 5:
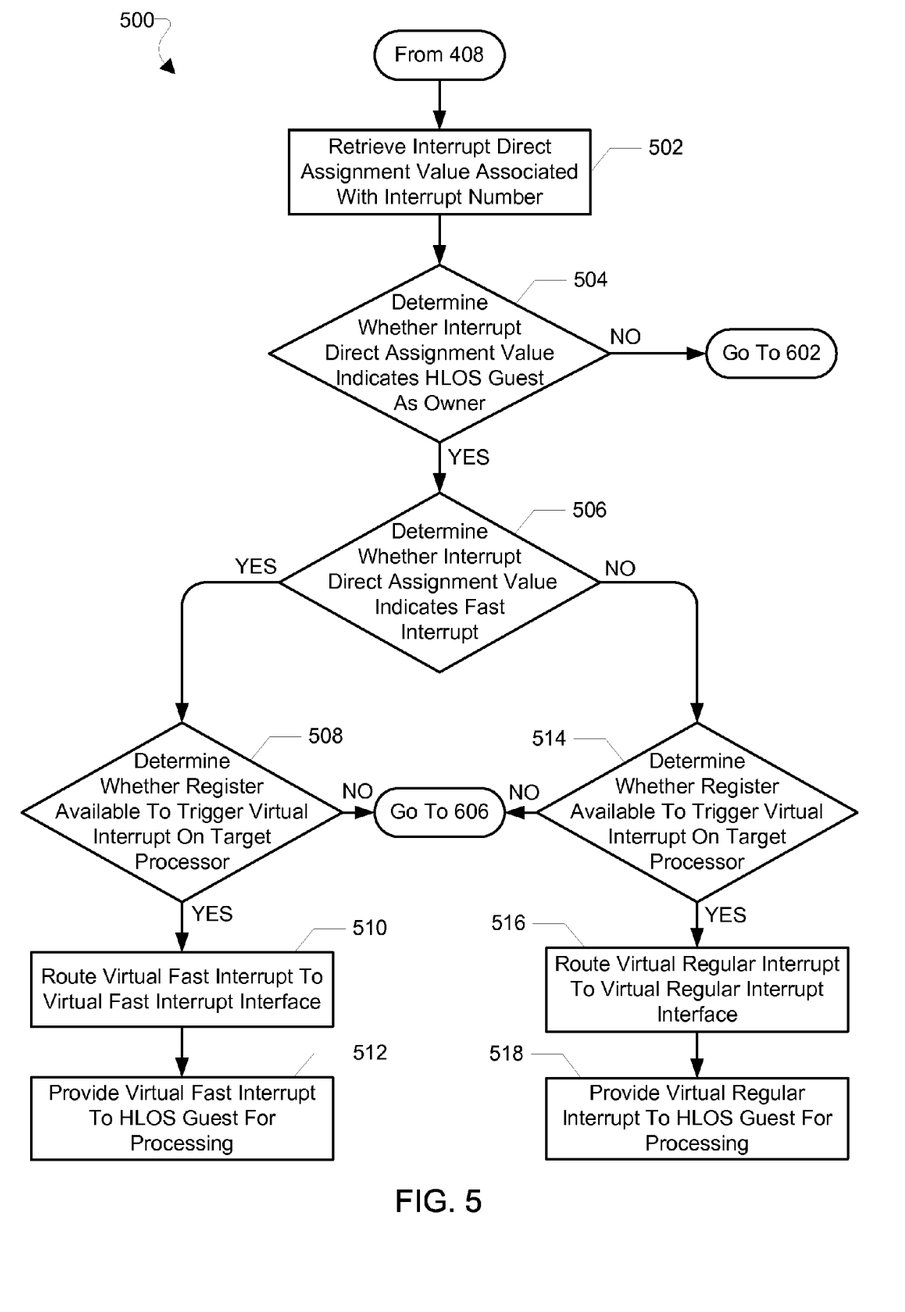
FIG. 5 is a schematic process flow diagram illustrating an aspect method for virtual interrupt direct assignment managing interrupts owned by the HLOS Guest.

FIG. 5 illustrates an aspect method 500 for virtual interrupt direct assignment managing interrupts owned by the HLOS Guest. The SoC, including the processors having the secure and non-secure executing environments and the interrupt controller including its components as described herein, may implement this method 500. In block 502 the SoC may retrieve the interrupt direct assignment value associated with the interrupt number. As described herein, the interrupt direct assignment value is the value for the interrupt direct assignment identifier of the interrupt. The SoC may use the interrupt direct assignment value to determine whether the interrupt is owned by the VMM or by the HLOS Guest, and if owned by the HLOS Guest, to determine whether the interrupt is a normal or fast interrupt. This information may aid the SoC to determine to the processor to which the interrupt should routed and the SoC components through which to route the interrupt. In determination block 504 the SoC may determine whether the interrupt direct assignment value indicates that the HLOS Guest is the interrupt owner, or that the VMM is the interrupt owner. When the interrupt direct assignment value indicates that the interrupt is not owned by the HLOS Guest (i.e., determination block 504="No"), the SoC may determine that the VMM is the interrupt owner and perform the operations in block 602 of method 600 described below with reference to FIG. 6.

When the SoC determines that the HLOS Guest is the interrupt owner (i.e., determination block 504="Yes"), in determination block 506 the SoC may determine whether the interrupt direct assignment value indicates that the interrupt is a fast interrupt, or a normal interrupt. As described herein, the application of this method 500 is not limited to just two speeds or priorities of interrupts, and the direct assignment characteristics of an interrupt may indicate a variety of speeds or priorities. In this example, a fast interrupt holds a higher priority than a normal interrupt, which may affect the routing and processing of the interrupts. When the interrupt direct assignment value indicates that the interrupt is a fast interrupt (i.e., determination block 506="Yes"), the SoC may determine whether a register is available to trigger the fast interrupt on the target processor. The registers may hold a number or pending interrupts and the slots of the register may provide for holding the interrupt number and the interrupt security group value. The register slots may also hold the interrupt direct assignment value, however, in some aspects this may not be necessary as the interrupt may be routed through hardware dedicated to routing the interrupt to a particular owner. When the SoC determines that the registers are not available to trigger the fast interrupt on the target processor (i.e., determination block 508="No"), the SoC may perform the operations in block 606 of method 600 described below with reference to FIG. 6.

When the SoC determines that a register is available to trigger the fast interrupt on the target processor (i.e., determination block 508="Yes"), the SoC may route the fast interrupt to the appropriate interrupt interface in block 510. In an aspect, the SoC may include dedicated interfaces for the fast interrupts. In another aspect, the SoC may manage placement of the fast interrupts in the registers such that the interrupts are routed to the interfaces at a time in accordance with the interrupt speed or priority relative to the other interrupts in the register. In block 512 the SoC may provide the fast interrupt to the appropriate HLOS Guest owner of the interrupt, located on the processor, for processing the fast interrupt.

When the interrupt direct assignment value indicates that the interrupt is not a fast interrupt (i.e., determination block 506="No"), the SoC may determine that the interrupt is a normal interrupt, and in determination block 514 the SoC may determine whether a register is available to trigger the normal interrupt on the target processor. When the SoC determines that the registers are not available to trigger the normal interrupt on the target processor (i.e., determination block 514="No"), the SoC may per perform operations in block 606 of method 600 described below with reference to FIG. 6. When the SoC determines that a register is available to trigger the normal interrupt on the target processor (i.e., determination block 514="Yes"), in block 516 the SoC may route the normal interrupt to the appropriate interrupt interface. In an aspect, the SoC may include dedicated interfaces for the normal interrupts. In another aspect, the SoC may manage placement of the normal interrupts in the registers such that the interrupts are routed to the interfaces at a time in accordance with the interrupt speed or priority relative to the other interrupts in the register. In block 518 the SoC may provide the normal interrupt to the appropriate HLOS Guest owner of the interrupt, located on the processor, for processing the normal interrupt.

Figure 6:
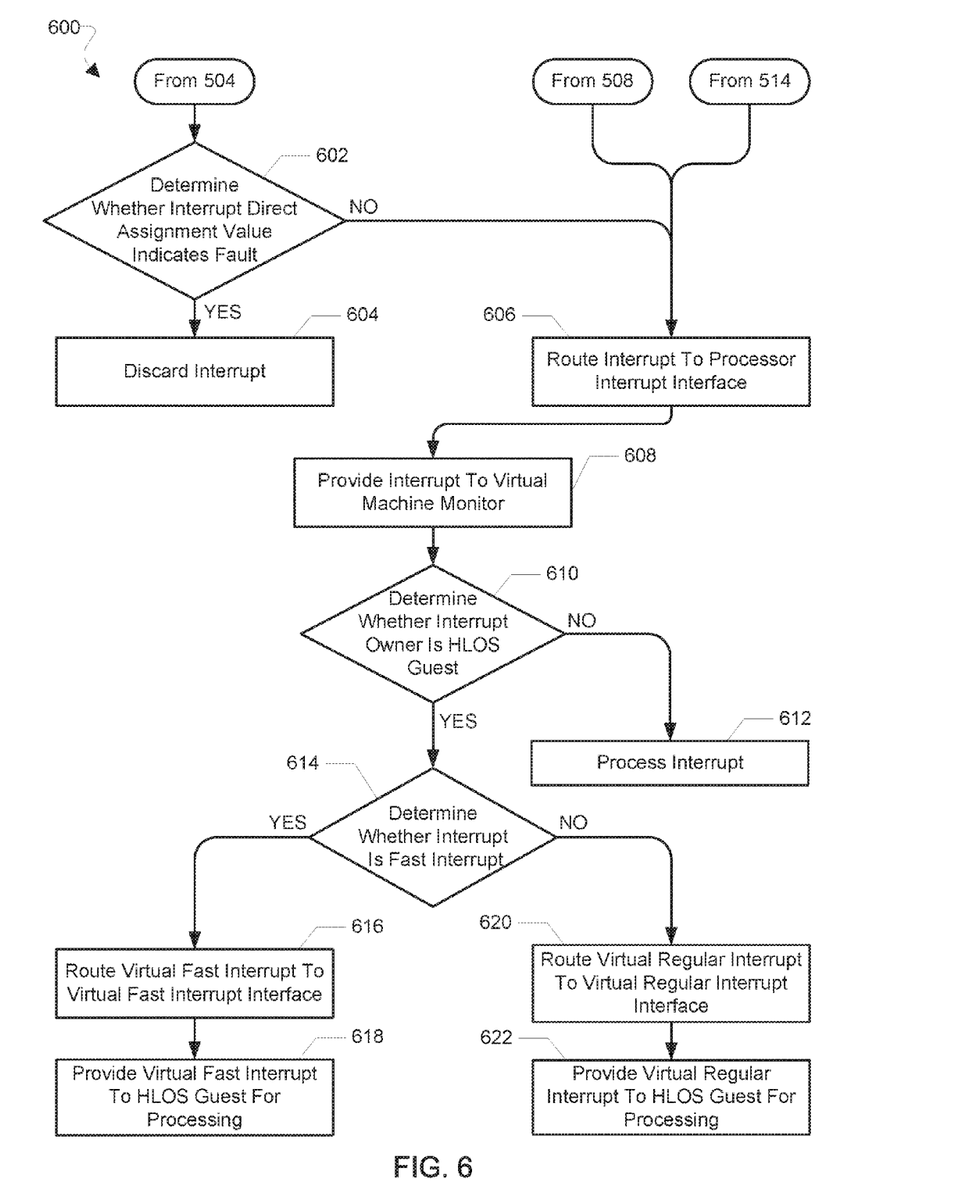
FIG. 6 is a schematic process flow diagram illustrating an aspect method for virtual interrupt direct assignment managing interrupts owned by the VMM and interrupts owned by the HLOS Guest.

FIG. 6 illustrates an aspect method 600 for virtual interrupt direct assignment managing interrupts owned by the VMM and interrupts owned by the HLOS Guest. The SoC, including the processors having the secure and non-secure executing environments and the interrupt controller including its components as described herein, may implement this method 600. In determination block 602 the SoC may determine whether the interrupt direct assignment value indicates a fault (or an unexpected or unrecognized interrupt), or whether the VMM is the interrupt owner. When the SoC determines that the interrupt direct assignment value indicates a fault (i.e., determination block 602="Yes"), the SoC may discard the interrupt in block 604. When the SoC determines that the interrupt direct assignment value does not indicate a fault (i.e., determination block 602="No"), the SoC may determine that the VMM is the interrupt owner. In block 606 SoC may either have a VMM owned interrupt or an HLOS Guest owned interrupt that is not able to be placed in a register for the HLOS Guest, thus the SoC may route the interrupt to the appropriate interrupt interface such that the interrupt is provided to the VMM regardless of the owner. In an aspect, the SoC may include dedicated interfaces for the VMM owned interrupts and HLOS Guest interrupts to be routed to the VMM. In another aspect, the SoC may manage placement of the VMM owned interrupts in the registers such that the interrupts are routed to the interfaces at a time in accordance with VMM ownership of the interrupt. In block 608 the SoC may provide the interrupt, regardless of the owner, to the VMM on the processor to determine the owner of the interrupt.

In determination block 610, the processor may determine whether the interrupt owner is the HLOS Guest or the VMM. When the processor determines that the interrupt is not owned by the HLOS Guest (i.e., determination block 610="No"), the processor may determine that the VMM is the interrupt owner and the processor may process the interrupt in block 612. When the processor determines that the HLOS Guest is the interrupt owner (i.e., determination block 610="Yes"), the processor may determine whether the interrupt is a fast interrupt or a normal interrupt in determination block 614. When the processor determines that the interrupt is a fast interrupt (i.e., determination block 614="Yes"), the processor may route the fast interrupt to the appropriate interrupt interface in block 516. In block 518 the processor may provide the fast interrupt to the appropriate HLOS Guest owner of the interrupt for processing the fast interrupt.

When the processor determines that the interrupt is not a fast interrupt (i.e., determination block 614="No"), the processor may determine that the interrupt is a normal interrupt and the processor may route the normal interrupt to the appropriate interrupt interface in block 620. In block 622 the processor may provide the normal interrupt to the appropriate HLOS Guest owner of the interrupt for processing the normal interrupt.

Figure 7:
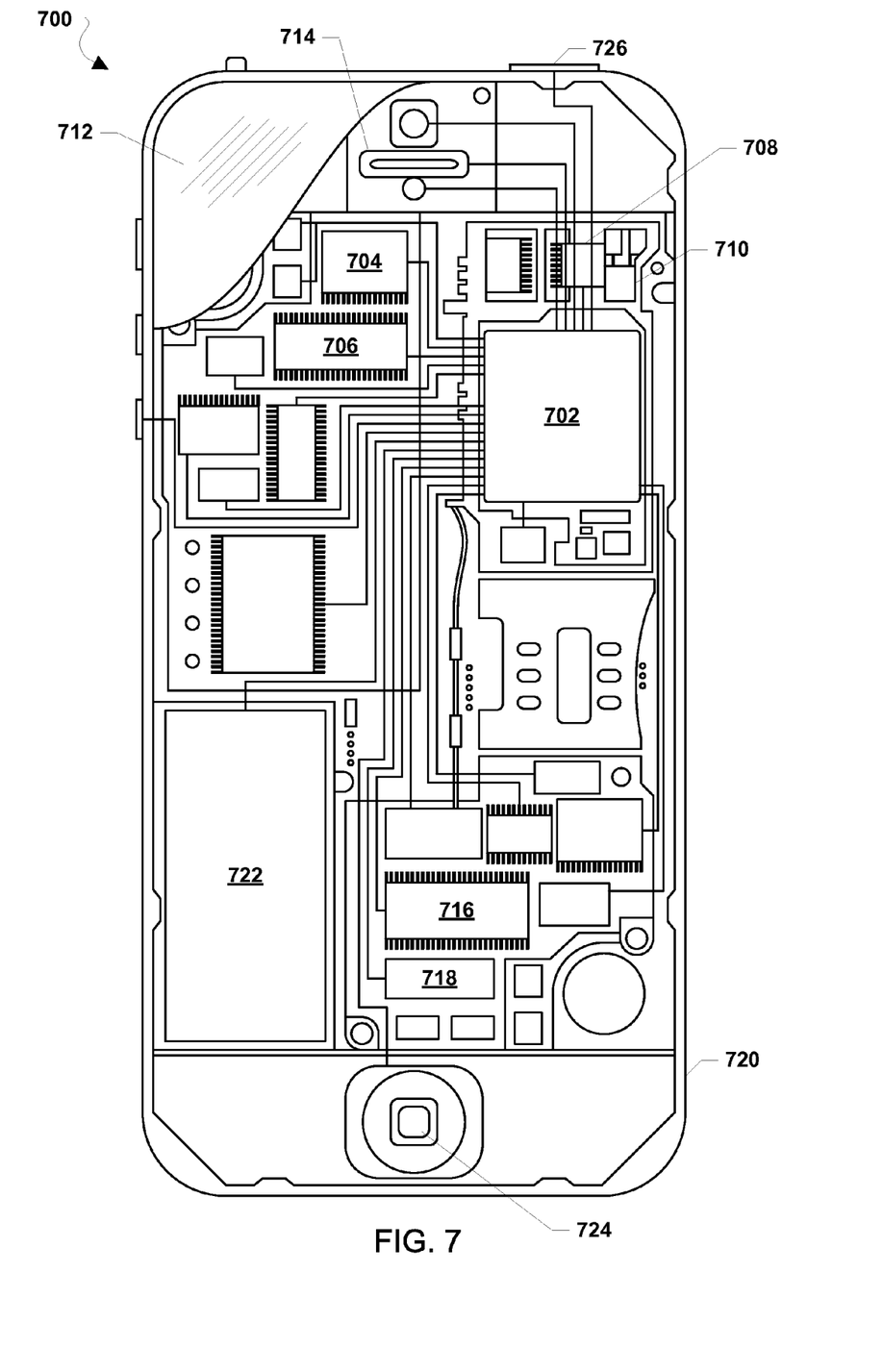
FIG. 7 is component block diagram illustrating an exemplary mobile device suitable for use with the various aspects.

FIG. 7 illustrates an exemplary mobile device suitable for use with the various aspects. The mobile device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the computing device 700 need not have touch screen capability.

The mobile device 700 may have one or more radio signal transceivers 708 (e.g., Peanut, Bluetooth, Zigbee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile device 700 may include a cellular network wireless modem chip 716 that enables communication via a cellular network and is coupled to the processor.

The mobile device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

The mobile device 700 may also include speakers 714 for providing audio outputs. The mobile device 700 may also include a housing 720, constructed of a plastic, metal, or a combination of materials, for containing all or some of the components discussed herein. The mobile device 700 may include a power source 722 coupled to the processor 702, such as a disposable or rechargeable battery. The rechargeable battery may also be coupled to the peripheral device connection port to receive a charging current from a source external to the mobile device 700. The mobile device 700 may also include a physical button 724 for receiving user inputs. The mobile device 700 may also include a power button 726 for turning the mobile device 700 on and off.

Figure 8:
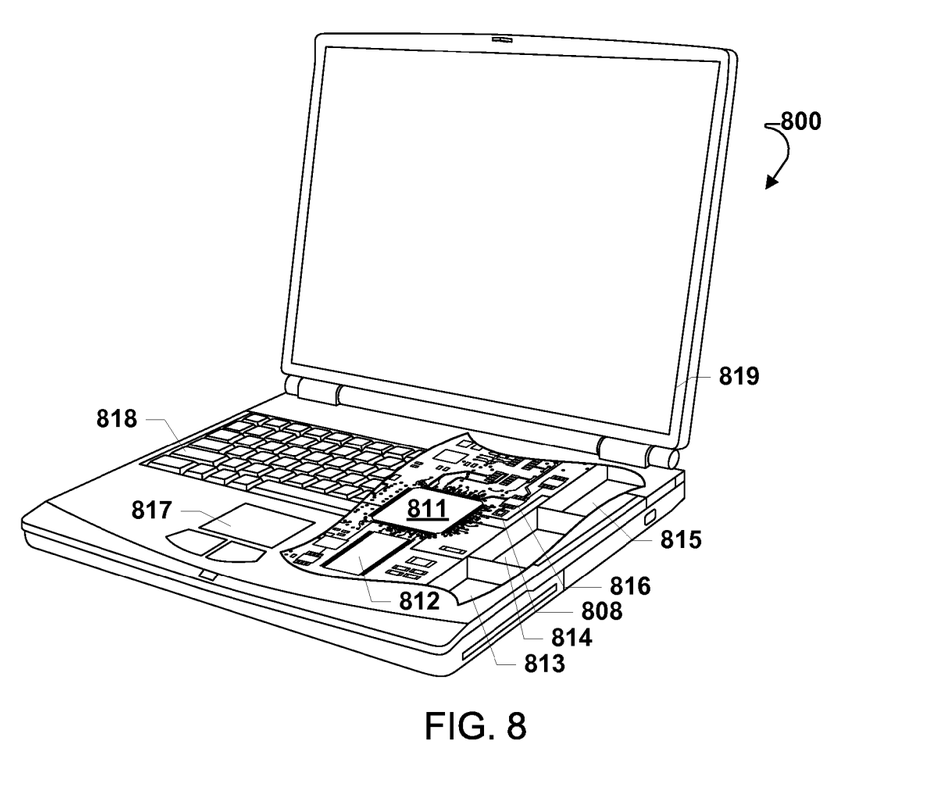
FIG. 8 is component block diagram illustrating an exemplary mobile device suitable for use with the various aspects.

The various aspects described above may also be implemented within a variety of mobile devices, such as a laptop computer 800 illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 811 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 811. The computer 800 may also include a floppy disc drive 814 and a compact disc (CD) drive 815 coupled to the processor 811. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various aspects.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for assigning one or more interrupts in a computing device, comprising:
    running, by a first processor, a high level operating system guest virtual machine;
    running, by a second processor, a virtual machine monitor;
    storing, by an interrupt direct assignment control register, a direct assignment control value;
    storing, by an interrupt direct assignment register, interrupt direct assignment values of interrupts;
    routing, by an interrupt distributor, the interrupt to a trusted execution environment when a configuration of an interrupt identifier indicates an associated security level;
    correlating, by the interrupt distributor, an interrupt direct assignment value with the interrupt, wherein the interrupt direct assignment value indicates an owner of the interrupt;
    routing, by the interrupt distributor, the interrupt to a high level operating system guest virtual machine as a fast virtual interrupt or a normal virtual interrupt when the interrupt direct assignment value indicates the high level operating system guest is the owner of the interrupt; and
    routing, by the interrupt distributor, the interrupt to a virtual machine monitor when the assignment value indicates the virtual machine monitor is the owner of the interrupt.

2. The method of claim 1, further comprising checking for an available spot in an interrupt list when the interrupt direct assignment value indicates the high level operating system guest is the owner of the interrupt, wherein routing the interrupt to the high level operating system guest virtual machine comprises:
    routing the interrupt to the high level operating system guest virtual machine when there is the available spot in the interrupt list bypassing the virtual machine monitor; and
    routing the interrupt to the virtual machine monitor when the interrupt list is occupied.

3. The method of claim 2, further comprising disabling correlating the interrupt direct assignment value to the interrupt when the interrupt list is occupied.

4. The method of claim 1, wherein:
    the interrupt direct assignment value further indicates a priority of the interrupt;
    routing the interrupt to the high level operating system guest virtual machine comprises routing the interrupt as a virtual interrupt corresponding to a physical interrupt, the virtual interrupt having a virtual interrupt identification being the same as a physical interrupt identification of the corresponding physical interrupt; and routing the interrupt to the virtual machine monitor comprises routing the interrupt as the physical interrupt.

5. The method of claim 4, wherein:
the priority of the interrupt comprises a fast interrupt and a normal interrupt;
routing the interrupt to the high level operating system guest virtual machine further comprises:
routing the interrupt to a first interrupt interface dedicated for fast virtual interrupts when the interrupt is the fast interrupt; and
routing the interrupt to a second interrupt interface dedicated for normal virtual interrupts when the interrupt is the normal interrupt.

6. The method of claim 1, wherein the configuration of the interrupt identifier comprises an interrupt security group value, the method further comprising:
correlating the interrupt security group value with the interrupt, wherein the interrupt security group value indicates an interrupt type; and
determining whether the interrupt is a secure interrupt type or a non-secure interrupt type,
wherein routing the interrupt to the trusted execution environment when the configuration of the interrupt identifier indicates the associated security level comprises routing the interrupt to the trusted execution environment on a processor when the interrupt security group value indicates the interrupt is of the secure interrupt type, and
wherein correlating the interrupt direct assignment value with the interrupt comprises correlating the interrupt direct assignment value with the interrupt when the interrupt security group value indicates the interrupt is of the non-secure interrupt type.

7. The method of claim 6, wherein:
routing the interrupt to the high level operating system guest virtual machine as the fast virtual interrupt or the normal virtual interrupt when the interrupt direct assignment value indicates the high level operating system guest is the owner of the interrupt comprises routing the interrupt to a normal execution environment on the processor; and
routing the interrupt to the virtual machine monitor when the assignment value indicates the virtual machine monitor is the owner of the interrupt comprises routing the interrupt to the normal execution environment on the processor.

8. A computing device, comprising:
a first processor configured to run a high level operating system guest virtual machine;
a second processor configured to run a virtual machine monitor;
an interrupt direct assignment control register configured to store a direct assignment control value;
an interrupt direct assignment register configured to store interrupt direct assignment values of interrupts; and
an interrupt distributor coupled to the interrupt direct assignment control register, the interrupt direct assignment register, the first processor, and the second processor, wherein the interrupt distributor is configured to perform operations comprising:
routing the interrupt to a trusted execution environment when a configuration of an interrupt identifier indicates an associated security level;
correlating an interrupt direct assignment value with the interrupt, wherein the interrupt direct assignment value indicates an owner of the interrupt;
routing the interrupt to the high level operating system guest virtual machine as a fast virtual interrupt or a normal virtual interrupt when the interrupt direct assignment value indicates the high level operating system guest is the owner of the interrupt; and
routing the interrupt to the virtual machine monitor when the assignment value indicates the virtual machine monitor is the owner of the interrupt.

9. The computing device of claim 8, further comprising an interrupt list register connected to the interrupt distributor configured to hold interrupt information, including an interrupt identifier,
wherein the interrupt distributor is further configured to perform operations comprising checking for an available spot in the interrupt list register when the interrupt direct assignment value is configured to indicate the high level operating system guest is the owner of the interrupt, and
wherein routing the interrupt to the high level operating system guest virtual machine comprises:
routing the interrupt to the high level operating system guest virtual machine when there is the available spot in the interrupt list bypassing the virtual machine monitor; and
routing the interrupt to the virtual machine monitor when the interrupt list is occupied.

10. The computing device of claim 9, further comprising a control interface configured to connect the second processor and the interrupt direct assignment control register, wherein the second processor is further configured to perform operations comprising disabling the interrupt direct assignment register when the interrupt list register is occupied.

11. The computing device of claim 8, wherein:
the interrupt direct assignment value is further configured to indicate a priority of the interrupt; and
the interrupt distributor is further configured to perform operations comprising:
routing the interrupt to the high level operating system guest virtual machine as a virtual interrupt corresponding to a physical interrupt, the virtual interrupt having a virtual interrupt identification being the same as a physical interrupt identification of the corresponding physical interrupt; and
routing the interrupt to the virtual machine monitor as the physical interrupt.

12. The computing device of claim 11, further comprising:
a first interrupt interface connected to the interrupt distributor and the first processor, and configured to route the interrupt to the first processor; and
a second interrupt interface connected to the interrupt distributor and the first processor, and configured to route the interrupt to the first processor;
wherein:
the priority of the interrupt comprises a fast interrupt and a normal interrupt; and
the interrupt distributor is further configured to perform operations such that routing the interrupt to the high level operating system guest virtual machine comprises routing the fast interrupt to the first interrupt interface, wherein the first interrupt interface is dedicated for fast virtual interrupts, and routing the normal interrupt to the second interrupt interface, wherein the second interrupt interface is dedicated for normal virtual interrupts.

13. The computing device of claim 8, wherein:
the configuration of the interrupt identifier comprises an interrupt security group value;

the interrupt distributor is further configured to perform operations comprising:
correlating the interrupt security group value with the interrupt, wherein the interrupt security group value indicates an interrupt type;
determining whether the interrupt is a secure interrupt type or a non-secure interrupt type;
the interrupt distributor is further configured to perform operations such that routing the interrupt to the trusted execution environment when the configuration of the interrupt identifier indicates the associated security level comprises routing the interrupt to the trusted execution environment of the first processor or the second processor when the interrupt security group value indicates the interrupt is of the secure interrupt type; and
the interrupt distributor is further configured to perform operations such that correlating the interrupt direct assignment value with the interrupt comprises correlating the interrupt direct assignment value with the interrupt when the interrupt security group value indicates the interrupt is of the non-secure interrupt type.

14. The computing device of claim 13, wherein the interrupt distributor is further configured to perform operations such that:
routing the interrupt to the high level operating system guest virtual machine as the fast virtual interrupt or the normal virtual interrupt when the interrupt direct assignment value indicates the high level operating system guest is the owner of the interrupt comprises routing the interrupt to a normal execution environment of the first processor; and
routing the interrupt to the virtual machine monitor when the assignment value indicates the virtual machine monitor is the owner of the interrupt comprises routing the interrupt to the normal execution environment of the second processor.

15. A computing device, comprising:
means for running a high level operating system guest virtual machine;
means for running a virtual machine monitor;
means for storing a direct assignment control value;
means for storing interrupt direct assignment values of interrupts;
means for routing an interrupt to a trusted execution environment when a configuration of an interrupt identifier indicates an associated security level;
means for correlating the interrupt direct assignment value with the interrupt, wherein the interrupt direct assignment value indicates an owner of the interrupt;
means for routing the interrupt to a high level operating system guest virtual machine as a fast virtual interrupt or a normal virtual interrupt when the interrupt direct assignment value indicates the high level operating system guest is the owner of the interrupt; and
means for routing the interrupt to a virtual machine monitor when the assignment value indicates the virtual machine monitor is the owner of the interrupt.

16. The computing device of claim 15, further comprising means for checking for an available spot in an interrupt list when the interrupt direct assignment value indicates the high level operating system guest is the owner of the interrupt,
wherein means for routing the interrupt to the high level operating system guest virtual machine comprises:
means for routing the interrupt to the high level operating system guest virtual machine when there is the available spot in the interrupt list bypassing the virtual machine monitor; and
means for routing the interrupt to the virtual machine monitor when the interrupt list is occupied.

17. The computing device of claim 16, further comprising means for disabling the means for correlating the interrupt direct assignment value to the interrupt when the interrupt list is occupied.

18. The computing device of claim 15, wherein:
the interrupt direct assignment value further indicates a priority of the interrupt;
means for routing the interrupt to the high level operating system guest virtual machine comprises means for routing the interrupt as a virtual interrupt corresponding to a physical interrupt, the virtual interrupt having a virtual interrupt identification being the same as a physical interrupt identification of the corresponding physical interrupt; and
means for routing the interrupt to the virtual machine monitor comprises means for routing the interrupt as the physical interrupt.

19. The computing device of claim 18, wherein:
the priority of the interrupt comprises a fast interrupt and a normal interrupt; and
means for routing the interrupt to the high level operating system guest virtual machine further comprises:
means for routing the fast interrupt to an first interrupt interface dedicated for fast virtual interrupts; and
means for routing the normal interrupt to a second interrupt interface dedicated for normal virtual interrupts.

20. The computing device of claim 15, wherein the configuration of the interrupt identifier comprises an interrupt security group value, the computing device further comprising:
means for correlating an interrupt security group value with the interrupt, wherein the interrupt security group value indicates an interrupt type;
means for determining whether the interrupt is a secure interrupt type or a non-secure interrupt type; and
wherein means routing the interrupt to the trusted execution environment when the configuration of the interrupt identifier indicates the associated security level comprises means for routing the interrupt to the trusted execution environment on a processor when the interrupt security group value indicates the interrupt is of the secure interrupt type,
wherein means for correlating the interrupt direct assignment value with the interrupt comprises means for correlating the interrupt direct assignment value with the interrupt when the interrupt security group value indicates the interrupt is of the non-secure interrupt type.

21. The computing device of claim 20, wherein:
means for routing the interrupt to the high level operating system guest virtual machine as the fast virtual interrupt or the normal virtual interrupt when the interrupt direct assignment value indicates the high level operating system guest is the owner of the interrupt comprises means for routing the interrupt to a normal execution environment on the processor; and
means for routing the interrupt to the virtual machine monitor when the assignment value indicates the virtual machine monitor is the owner of the interrupt comprises means for routing the interrupt to the normal execution environment on the processor.

* * * * *